United States Patent [19]

Okamura

[11] Patent Number: 5,783,928
[45] Date of Patent: Jul. 21, 1998

[54] STORAGE CAPACITOR POWER SUPPLY

[75] Inventor: Michio Okamura, Kanagawa, Japan

[73] Assignee: JEOL Ltd., Tokyo, Japan

[21] Appl. No.: 41,543

[22] Filed: Apr. 2, 1993

[30] Foreign Application Priority Data

Apr. 3, 1992 [JP] Japan ................................ 4-082173
Apr. 3, 1992 [JP] Japan ................................ 4-082174
Mar. 4, 1993 [JP] Japan ................................ 5-043467

[51] Int. Cl.$^6$ ................................ H01M 10/46
[52] U.S. Cl. ................................ 320/122; 320/167
[58] Field of Search ................................ 320/1, 56, 7, 16, 320/30, 39, 18, 118, 120, 122, 127, 132, 166, 167

[56] References Cited

U.S. PATENT DOCUMENTS 4,303,877  12/1981  Meinhold ................................ 320/18
4,709,200  11/1987  Ochiai ................................ 320/1
5,256,956  10/1993  Tsuchiya et al. ................................ 320/15

OTHER PUBLICATIONS

M.F. Rose "Performance Characteristics of Large Surface Area Chemical Double Layer Capacitors", Proc. Int. Power Sources Symp., vol. 33, pp. 572–592, 1988.
Communication from the European Patent Office enclosing the European Search Report for Application No. EP 93 30 2233 enclosing: EP-A-0 410 559; EP-A-0 101 017; Patent Abstracts of Japan, vol. 16, No. 472 (E-1272) 30 Sep. 1992 and JP-A-04 168 939, 17 Jun. 1992 *abstract*; Soviet Inventions Illustrated Week 7915, 23 May 1979, Derwent Publications Ltd., London, GB; AN 79-D2705B.
Bomko 'supply system for pulse gas–discharge lamp with control voltage limiter and inductance capacitance network energy measuring system to reduce charging current interval' and SU-A-608 274 (Bomko A.G.) 17 May 1978 *abstract* and WO-A-92 07371.

Primary Examiner—Edward Tso
Attorney, Agent, or Firm—Webb Ziesenheim Bruening Logsdon Orkin & Hanson, P.C.

[57] ABSTRACT

A long-lived, lightweight, and quickly and precisely charged storage capacitor power supply capable of stably supplying electric power to a load. The power supply has a capacitor block consisting of capacitors connected in series, in parallel or in any combination of series and parallel. The power supply further includes a charging circuit for charging the block, a charging power supply connected with the block via the charging circuit, and a charge-limiting circuit. This charge-limiting circuit detects the voltage across the terminals of the block and limits charging of the block if the voltage reaches a given value. One embodiment of the invention further includes a charge-limiting circuit, a full charge-detecting circuit, and a residual electricity-detecting circuit connected in parallel with the block. The charge-limiting circuit senses that the voltage across the terminals of the block exceeds the given value and causes the charging current to bypass the block. The full charge-detecting circuit senses that the charge-limiting circuit is operated and determines that full charge is attained. The residual electricity-detecting circuit finds the residual electric power from the voltage across the terminals of the block. Another embodiment has a first and a second capacitor block. The voltage across the terminals of the first block is detected. The first block is charged from the second block until the detected voltage reaches a given voltage. The first block supplies electric power directly to the load.

4 Claims, 7 Drawing Sheets

STORAGE CAPACITOR POWER SUPPLY

FIELD OF THE INVENTION

The present invention relates to a storage capacitor power supply which stores electrical power in a capacitor block consisting of a plurality of electric double layer capacitors connected in series, in parallel or in any combination of series and parallel and supplies electrical power to a load.

BACKGROUND OF THE INVENTION

Discussions have existed for many years as to whether exhaust gas from automobiles with gasoline engines should be controlled because of problems with the global environment. In practice, the annual production of automobiles is still on the upswing but there is no prospect of reduction in automobile emissions. Under these circumstances, electric vehicles with batteries or solar cells have attracted attention as vehicles producing no exhaust gas. Therefore, there is an urgent need of early realization of practical electric vehicles.

In recent years, electric vehicles have begun to be used as vehicles in business applications such as urban-delivery vehicles and garbage trucks which are not required to travel a long distance continuously or to run at high speeds. Vehicles running at high speeds faster than 100 km/h and traveling about 200 km continuously have been reported as experimental vehicles. Furthermore, vehicles which have solar cells on the top of the body and run while charging the cells have been proposed. In addition, hybrid vehicles driven by both an internal combustion engine and an electric motor have been proposed.

One promising type of electric vehicle is a vehicle which has no gearing as used in an automobile with an internal combustion engine but drives the four wheels independently, using wheel motors. The driving mechanism of this vehicle is simplified. Also, the problems with the operating characteristics and the operability can be solved by coordinating and controlling the wheel motors. The greatest technical problem with the electric vehicle is to realize an ideal power source, i.e., a battery having a capacity comparable to an automotive engine. In order to put the electric vehicle into practical use, a battery is needed which is comparable in size and weight to an internal combustion engine and whose capacity can deliver power comparable to the power delivered by a gasoline engine. Furthermore, the battery must be recharged quickly or must be replaced with a fully charged battery as simply as a supply of gasoline.

However, no conventional battery can satisfy the above-described requirements. One especially great problem is that it takes long for the prior art battery to be recharged. In spite of this fact, the prior art battery is larger in size and heavier than the internal combustion engine.

An electric double layer capacitor which is smaller in size but larger in capacitance than the prior art capacitor has been developed. This electric double layer capacitor tends to be used to back up a power supply or for other application. When a large-capacity capacitor such as this electric double layer capacitor is employed as a storage capacitor power supply, it has advantages in being lighter and having longer life than a lead-acid battery and other batteries. However, if the voltage applied to the electric double layer capacitor exceeds the rated voltage, then the capacitance of the capacitor is immediately reduced. Also, the leakage current increases. In this way, the capacitor is adversely affected. Another disadvantage is that the internal resistance and the maximum working voltage are not sufficiently controlled. For these reasons, positive use of the electric double layer capacitor for power use is not yet made.

Heretofore, when a secondary battery is recharged, various difficulties have arisen in precisely detecting the completion of the recharging or knowing how much electricity can still be obtained from the battery.

Various contrivances have been made to detect the completion of the recharging. One method is to set the end voltage at a given voltage. Another method is to estimate the completion from the amount of electricity flowed into the battery. A further method is to detect the instant at which the voltage slightly drops due to the temperature characteristics of the battery after it is recharged for a given time. In spite of these contrivances, the recharging characteristics vary widely according to the conditions of the battery, i.e., depending on whether the battery is new or old, on the extent to which the battery ages, on the recharging current, and on whether the battery has been used continuously or was recharged.

Also, various contrivances have been made to measure the remaining electric power. One method is to measure the terminal voltage while applying a given load. Another method is to calculate the amount from the amount of electricity charged and discharged. A further method is to estimate the amount from the temperature and the specific gravity of the electrolyte. However, the battery characteristics vary widely, depending on the performance of each individual battery, on whether the battery is new or old, on the history of the use of the battery, on the load, on the conditions imposed when the recharging is made, and on other factors.

As described above, it can be said that hardly any method of precisely detecting the full charge point at all times is available. Also, hardly any method of detecting the amount of the residual electric power in the battery exists. Furthermore, to make effective use of the electric power of the battery, it is customary to overcharge it to a given level. Also, it is essential to know the amount of the electricity remaining in the battery. In the future, electric vehicles will be put into practical use, and secondary batteries will be used routinely. Under these conditions, the wasteful consumption of electrical energy due to overcharge will present a problem that cannot be neglected. We may expect that the practicability of the battery depends on whether it is possible to know the distance that the vehicle can still travel.

SUMMARY OF THE INVENTION

It is an object of the present invention to provide a long-lived, lightweight storage capacitor power supply which is capable of being quickly charged and of supplying a regulated voltage to a load.

It is another object of the invention to provide a storage capacitor power supply which stores electricity efficiently by the use of capacitors and supplies electric power to a load.

It is a further object of the invention to provide a storage capacitor power supply which permits precise detection of full charge point, thus preventing wasteful overcharge and undercharge.

It is yet another object of the invention to provide a storage capacitor power supply which makes it possible to precisely measure the amount of remaining electricity and to reliably know the limit of the operation.

These objects are achieved in accordance with the teachings of the invention by a storage capacitor power supply adapted to store electricity in a capacitor block consisting of a plurality of capacitors connected in series, in parallel or in any combination of series and parallel and to supply electric power to a load, said power supply comprising: the capacitor block connected with the load and supplying electric power directly to the load; a charging circuit for electrically charging the capacitor block; a charging power supply connected with the capacitor block via the charging circuit; and charge-limiting circuits which detect the voltages developed across the capacitors and limit charging of the capacitors if the detected voltages reach a given value.

One embodiment of the invention further includes charge-limiting circuits and full charge-detecting circuits connected in parallel with their respective capacitors. The charge-limiting circuits cause the charging current to bypass the capacitors. The full charge-detecting circuits sense that the charge-limiting circuits are operated and make a decision to see that full charge is attained. In another embodiment, the power supply further includes a residual electricity-detecting circuit. This residual electricity-detecting circuit consists of a multiplier and an arithmetic circuit. The multiplier takes the voltage developed across the capacitor and produces the square of the taken voltage. The arithmetic circuit multiplies the voltage by a constant factor. In a further embodiment, the residual electricity-detecting circuit takes the voltage developed across the terminals of the capacitor, applies the voltage to a series combination of a resistor, a voltage regulation element, and a detecting device, and detects a current according to the residual electricity by means of the detecting device.

The invention further offers a storage capacitor power supply for supplying electric power to a load from charged capacitors, said power supply comprising: a first capacitor block connected with the load and supplying electric power directly to the load; a charging circuit for electrically charging the first capacitor block; a second capacitor block connected with the first capacitor block via the charging circuit and acting as a power supply for the first capacitor block; and a charging control circuit which detects the voltage developed across the terminals of the first capacitor block and controls the charging circuit in such a way that the first capacitor block is charged by the second capacitor block until the detected voltage reaches a given voltage.

The novel storage capacitor power supply comprises the capacitor block connected with the load and supplying electric power directly to the load, the charging circuit electrically charging the capacitor block, and the charging power supply connected with the capacitor block via the charging circuit. The voltage developed across the terminals of each capacitor is detected. The charge-limiting circuit senses that this voltage has reached a given value and limits charging of the capacitor. Therefore, the capacitor block can be used up to the intended maximum voltage. Hence, the efficiency at which the electrical energy is stored can be enhanced.

Other objects and features of the invention will appear in the course of the description thereof which follows.

DETAILED DESCRIPTION OF THE INVENTION

Figure 1:
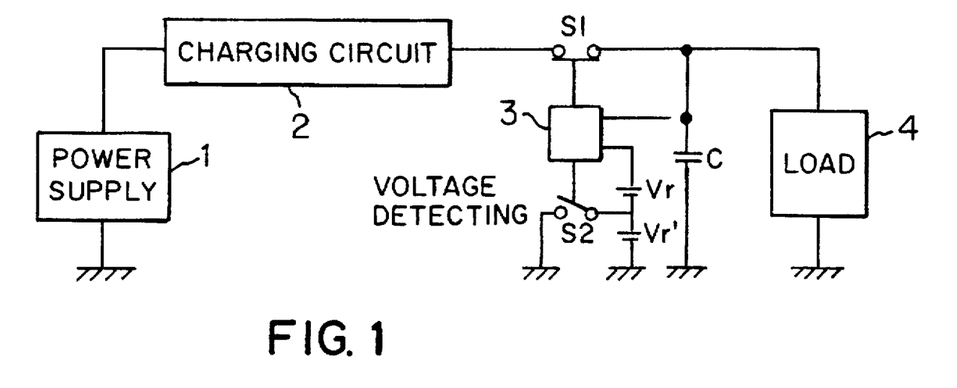
FIG. 1 is a circuit diagram of a storage capacitor power supply according to the invention.

Referring to FIG. 1, there is shown a storage capacitor power supply according to the invention. This power supply comprises a charging power supply 1, a charging circuit 2, a voltage-detecting circuit 3, a capacitor C having a large capacitance, reference voltage sources producing reference voltages Vr and Vr', respectively, and switches S1 and S2. A load 4 is connected with this storage capacitor power supply.

The capacitor C having a large capacitance is connected with the charging power supply 1 via the switch S1 and via the charging circuit 2. The capacitor C is also connected with the load 4. The capacitor C supplies electric power directly to the load 4. The charging power supply 1 which acts to electrically charge the capacitor C can be the commercial power line. The charging circuit 2 has a voltage converter means such as a DC—DC converter. The voltage-detecting circuit 3 compares the voltage developed across the terminals of the capacitor C with the reference voltages Vr and Vr' and senses whether the voltage across the terminals of the capacitor C is the fully charged level. If this level is reached, the voltage-detecting circuit 3 opens the switch S1 and closes the switch S2. Accordingly, by setting the reference voltage Vr+Vr' to the fully charged level, the large-capacity capacitor C is electrically charged from the charging power supply 1 via the charging circuit 2 while the switch S1 is kept closed until the voltage developed across the terminal of the capacitor C reaches the fully charged level. When the fully charged level is reached, the switch S1 is opened to stop the charging. This prevents the voltage applied to the capacitor C from becoming excessively large compared with the rated voltage. At this time, the switch S2 is closed to short-circuit the reference voltage Vr'. Thus, a dead band is established for the turning on and off of the switch S1.

As mentioned previously, where a capacitor is used as a power supply, if the applied voltage becomes excessive compared with the rated value of the capacitor, then the capacitance of the capacitor will immediately decrease, the leakage current will increase, and other problems will take place. To cope with these problems, it is customary to design and manufacture the capacitor in such a way that allowances are given to the decomposition voltage and to the maximum working voltage. However, the electrical energy stored in a capacitor is proportional to the square of the voltage and, therefore, it is advantageous to increase the used highest voltage as high as possible. In view of these facts, in the present invention, the voltage developed across the terminals of the capacitor is constantly monitored and limited by the switch S1. Consequently, the capacitor can be used up to its maximum voltage. Hence, maximum allowable electrical energy can be stored effectively.

Figure 2:
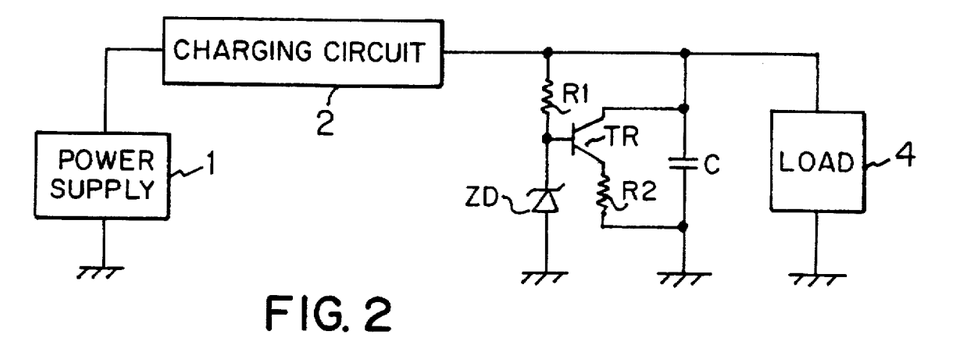
FIG. 2 is a circuit diagram of another storage capacitor power supply according to the invention.

Referring next to FIG. 2, there is shown another storage capacitor power supply according to the invention. This power supply is similar to the power supply already described in connection with FIG. 1 except that a series combination of a transistor TR and a resistor R2 is connected as a bypass circuit for the charging current flowing into the large-capacity capacitor C, and that the voltage produced across the terminals of the capacitor C is limited to a voltage set by a voltage regulation device ZD. Also shown is a resistor R1. The voltage set by the voltage regulation device ZD is selected to be equal to the voltage assumed when the capacitor C is fully charged. In this fully charged condition, the transistor TR conducts. The current flowing through the conducting transistor TR varies so as to maintain the voltage developed across the terminals of the capacitor C at the voltage corresponding to the fully charged condition. That is, a voltage limiter is formed.

Figure 3:
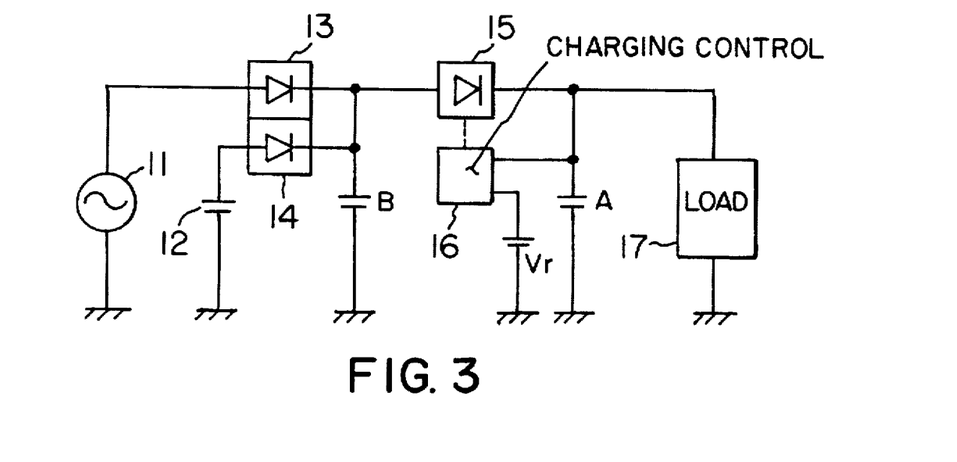
FIG. 3 is a circuit diagram of a further storage capacitor power supply according to the invention.

Referring to FIG. 3, there is shown a further storage battery power supply according to the invention. This power supply comprises a charging AC power supply I1, a charging DC power supply 12, charging circuits 13–15, a charging control circuit 16, capacitor blocks A and B, and a reference voltage source producing a reference voltage Vr. A load 17 is connected with this storage capacitor power supply.

The capacitor block A is a power supply for supplying electric power to the load 17. This block A is connected with the load 17 and supplies electric power directly to the load 17. A large-capacity capacitor having a low internal resistance and an energy density which is not very high is used as the capacitor block A. The capacitor block B is a power supply which electrically charges the capacitor block A. The internal resistance of the block B is higher than that of the block A. A large-capacity capacitor having large electrical energy per unit volume or weight is used as the capacitor block B. The charging circuit 15 causes the capacitor block B to electrically charge the capacitor block A. The charging circuit 15 is composed of a voltage converter means such as a DC—DC convertor. The charging control circuit 16 detects the voltage developed across the terminals of the capacitor block A, or the load voltage, and compares the detected voltage with the reference voltage Vr. If the voltage is less than Vr, the control circuit 16 controls the charging circuit 15 so as to electrically charge the capacitor block A from the capacitor block B. The reference voltage Vr is set to the level at which the capacitor block A is fully electrically charged.

The charging AC power supply I1 consists, for example, of an ordinary AC power line. The charging DC power supply 12 is composed of a DC power supply such as a stock of solar cells. The charging circuits 13 and 14 provide conversion and rectification of the input voltage and electrically charge the capacitor block B. Of course, the charging circuits 13 and 14 can be composed of voltage converter means such as inverters.

As described above, the required power supply capacity is assigned to two power supply portions, i.e., the capacitor blocks A and B. One fourth of the total capacity is assigned to the block A, while the remaining three fourths is assigned to the block B. These ratios may vary according to the load and other conditions. The capacitor block A is maintained at its fully charged level as faithfully as possible. In this way, the load is always supplied with a relatively constant voltage from the power supply of the lower internal resistance, or the capacitor block A. Furthermore, many power supplies, i.e., the capacitors forming the block B, which are easy to manufacture and have a high internal resistance are employed and so the volume and the weight of the whole storage capacitor power supply can be suppressed.

Figure 4:
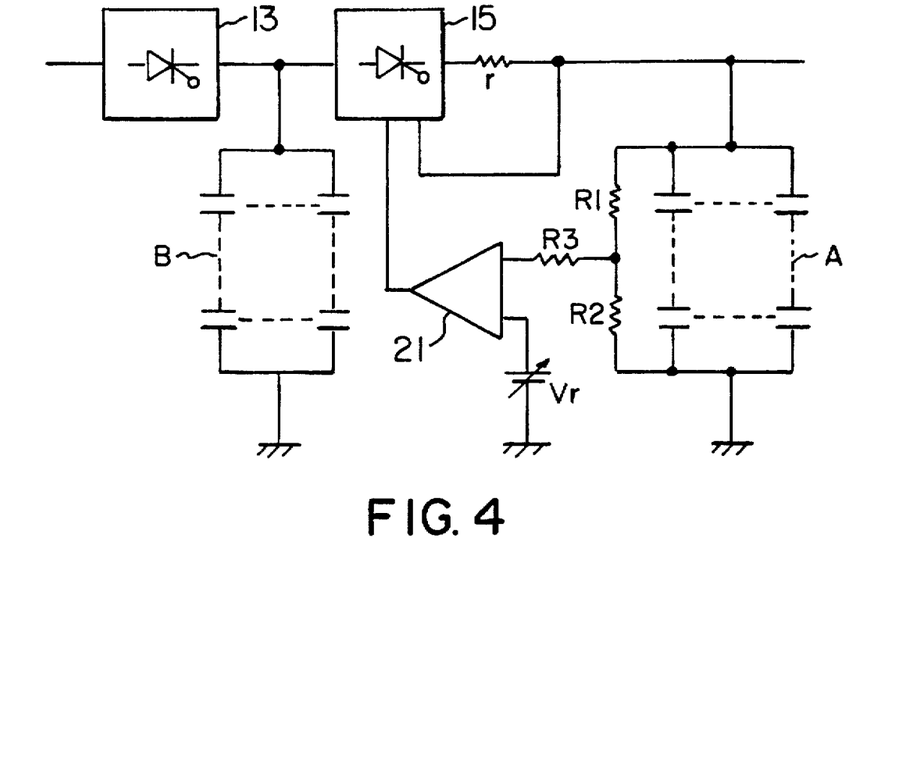
FIG. 4 is a circuit diagram of the charging control portion included in the power supply shown in FIG. 3.

FIG. 4 shows an example of the configuration of the charging control portion of the storage capacitor power supply shown in FIG. 3. A comparator 21 compares the voltage developed across the terminals of the capacitor block A with the reference voltage Vr and produces a signal which operates the charging circuit 15 when the reference voltage is higher. Resistors R1 and R2 divide the voltage developed across the terminals of the capacitor block A and detect the voltage. The detected voltage is applied to the comparator 21 via a resistor R3. As described later, charge-limiting circuits may be connected with their respective capacitors of the block A, and the fully charged condition may be detected. A resistor r is used to detect the charging current. The charging circuit 15 cooperates with the resistor r to detect and regulate the charging current. In particular, the charging circuit 15 is turned on and off by the output signal from the comparator 21. The charging current is controlled by making use of the detection of the current, utilizing the resistor r. The capacitor block B is a power supply having a large internal resistance. If the block B is electrically charged with a large current, the loss will increase. This loss is reduced by limiting the charging current.

An electric double layer capacitor used in the present invention is next described. The electrodes of this capacitor are made of activated carbon which has a large specific surface and is electrochemically inactive. The electrodes are combined with an electrolyte to provide a large electric double layer capacitance. When the voltage applied between the electrodes is increased, the electric double layer is formed and the capacitor is electrically charged until the decomposition voltage of the electrolyte is reached, whereupon a current begins to flow. Therefore, the maximum working voltage of this electric double layer capacitor is restricted by the decomposition voltage of the electrolyte. The decomposition voltage of the electrolyte of a water solution having a high electric conductivity is about 1.23 V. Electric double layer capacitors having maximum working voltages of several volts and capacitances of several farads are commercially available. The internal resistance values vary widely from 100Ω to about 10Ω. A recent experimental electric double layer capacitor is reported to have 2.5 V, 240 F, and 0.1Ω.

Where the prior art electric double layer capacitor is used as a storage capacitor power supply, the maximum working voltage is low, and the amount of stored electric charge is small. In addition, the amount of charge stored in the electric double layer capacitor is only one twentieth of the amount of charge stored in lead-acid batteries and nickel/cadmium batteries on the relation between the energy and the weight. Also, the internal resistance of the electric double layer capacitor is large. Therefore, the electric double layer capacitor cannot be used in high power applications. A fundamental method of permitting the electric double layer capacitor to rival lead-acid batteries is to increase the energy density and reduce the internal resistance.

Generally, if a voltage exceeding the decomposition voltage is applied to a capacitor, decrease in the capacitance, increase in the leakage current, and other problems will occur. Therefore, a voltage lower than the decomposition voltage is used as the maximum working voltage. The decomposition voltage is 1.23 V for the case of water and about 1.5 to 2.5 V for the case of normally used organic electrolytes. On the other hand, numerous solvents of chemical materials exist which exhibit decomposition voltages exceeding 6 V in organic electrolytes. However, where they are used in an electric double layer capacitor in practice, the rated maximum working voltage is restricted to 1.5 to 2.5 V. We consider that this is due to impurities, including water.

Various foreign substances are naturally adsorbed to porous electrodes consisting of activated carbon or fibers of activated carbon. If these electrodes are used as they are, the various foreign substances are dissolved in an electrolyte when the electrodes are immersed in the electrolyte. Therefore, if the electrolyte is highly refined, the purity deteriorates, thus lowering the decomposition voltage. Thus, the foreign substances can be removed by previously heating the electrodes in a vacuum vessel by RF heating while evacuating the inside of the vessel, then cooling the electrodes as they are, and immersing them in an electrolyte in a vacuum. Also, decrease in the purity of the electrolyte can be prevented.

In an electrode structure providing a large electrostatic capacitance and a low internal resistance, activated carbon fibers are activated slightly excessively to obtain fibers having somewhat large micropores. These fibers are aligned and arranged closely in a plane. A metal such as aluminum is deposited by evaporation or thermal spraying on both ends and the rear surface of the fiber array, or the electrodes are connected by a conductive paint or the like. Then, lead wires are attached. In this manner, electrodes having a low electrical resistance and a high density can be obtained. These electrodes are impregnated with an electrolyte. The electrodes are mounted on opposite sides of an insulating porous separator. They are used as positive and negative electrodes, respectively.

An electric double layer capacitor having a high maximum working voltage can be derived by refining the electrolyte and fabricating and assembling the activated carbon electrodes as described above. Also, the internal resistance can be reduced. As a result, if the maximum working voltage is increased by a factor of 2, for example, then the amount of stored electric charge can be increased fourfold, i.e., the square of 2. The previously mentioned experimental electric double layer capacitor of 2.5 V, 240 F, and 0.1Ω measures 35 mm in diameter by 50 mm. The electric energy that can be taken up to 1 V is 0.175 watt-hour (WH). To secure an electric energy of 20 KWH required for the power source of an electric vehicle, a volume of about 6 m$^3$ is needed. As an example, however, the volume can be reduced to one-fourth only by doubling the maximum working voltage. Furthermore, the packaging density can be increased by a factor of 2.5. The novel storage capacitor power supply using two capacitor blocks and the charge-limiting circuits improves the amount of stored charge by a factor of about 2. Also, there is a possibility of increase in the electrostatic capacitance. In this way, the amount of stored charge can be increased by a factor exceeding 20. Such electric double layer capacitors are used in different manners to increase the stored electrical energy. Also, the internal resistance is reduced to reduce the energy loss. In consequence, the efficiency at which electric power is supplied can be enhanced.

In the structure constructed as described thus far, the charging is controlled separately for each individual capacitor block. Electric double layer capacitors have low maximum working voltage of 2.5 to 5 V. Therefore, where they are used in electric power applications, they are connected in series. In this structure, if the voltages assigned to the capacitors are different, the capacitors will successively exceed their rated values from the smallest capacitor and get damaged. To avoid this, they must be used within voltage ranges lower than the rated values. In this case, where charge-limiting circuits are connected with all the capacitors, respectively, and they are connected in series, if one capacitor reaches its rated value, the charge-limiting circuit connected with this capacitor turns on the bypass circuit, thus preventing all the capacitors from being applied with voltages exceeding their rated voltages. Consequently, they can be used up to the rated voltages safely. In the novel electric double layer capacitor utilizing an electric double layer capacitor, a charge-limiting circuit is inserted in each cell to monitor the voltages at the cells and make uniform the voltages as described above. Examples of the charge-limiting circuit and an example of a full charge-detecting circuit are described below.

Figure 5:
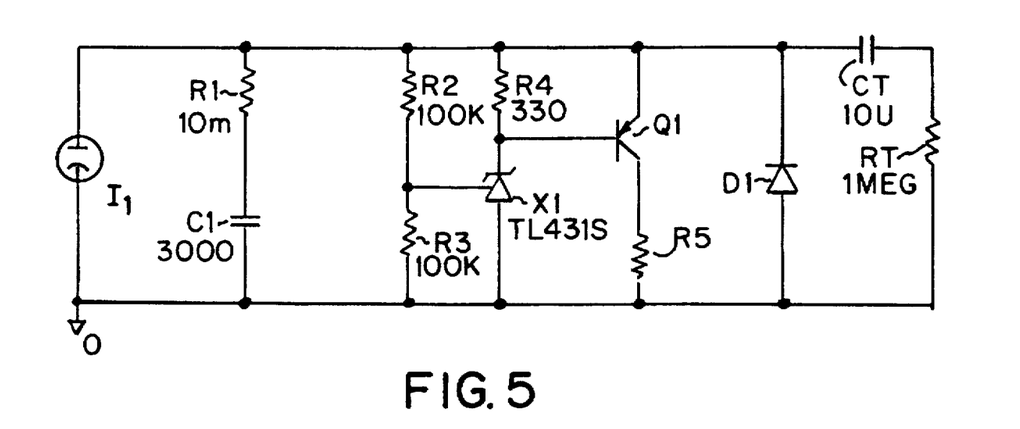
FIG. 5 is a circuit diagram of a full charge-detecting circuit in which a charge-limiting circuit has been inserted.
Figure 6:
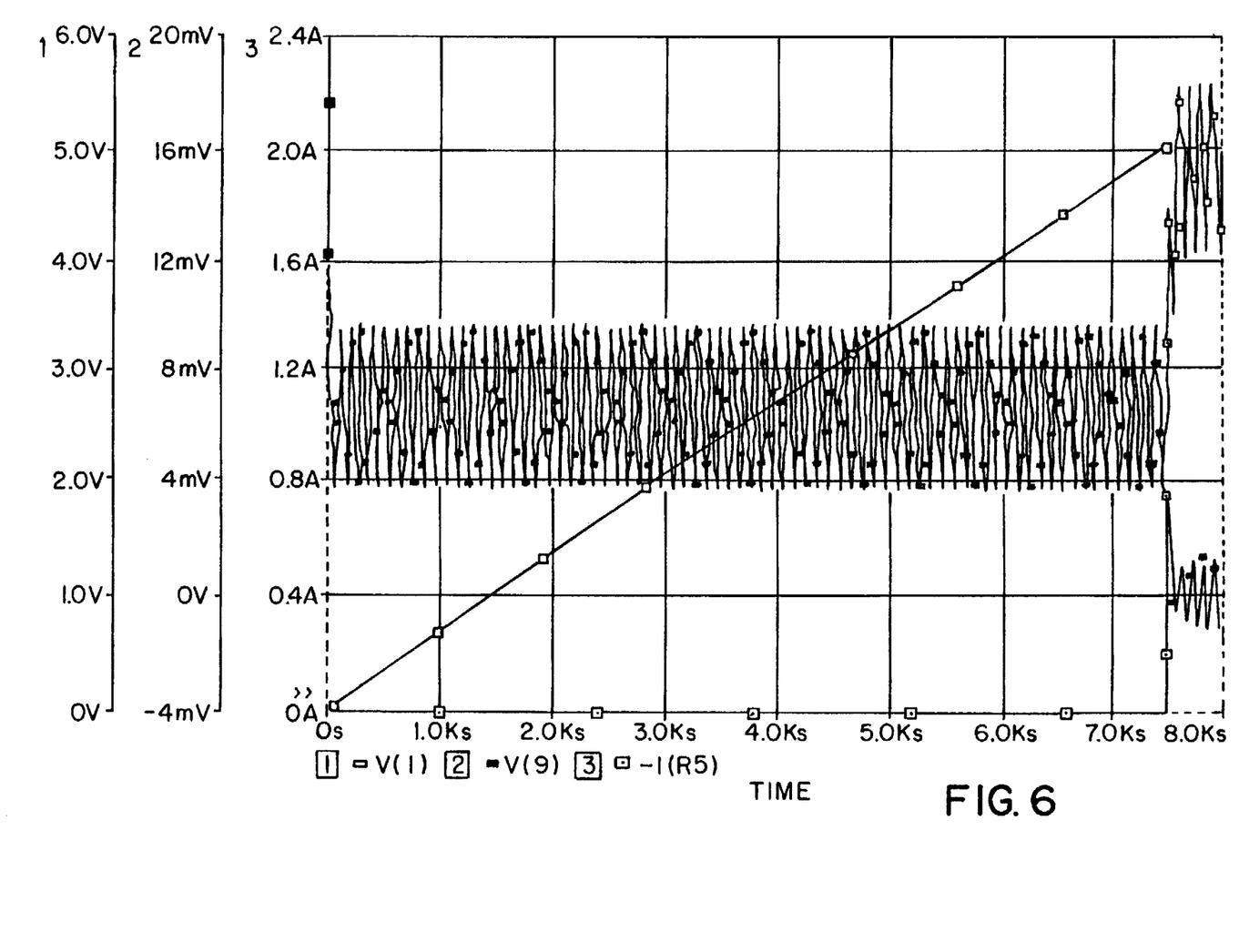
FIG. 6 shows waveforms illustrating the results of an analysis simulating the full charge-detecting circuit shown in FIG. 5.
Figure 7:
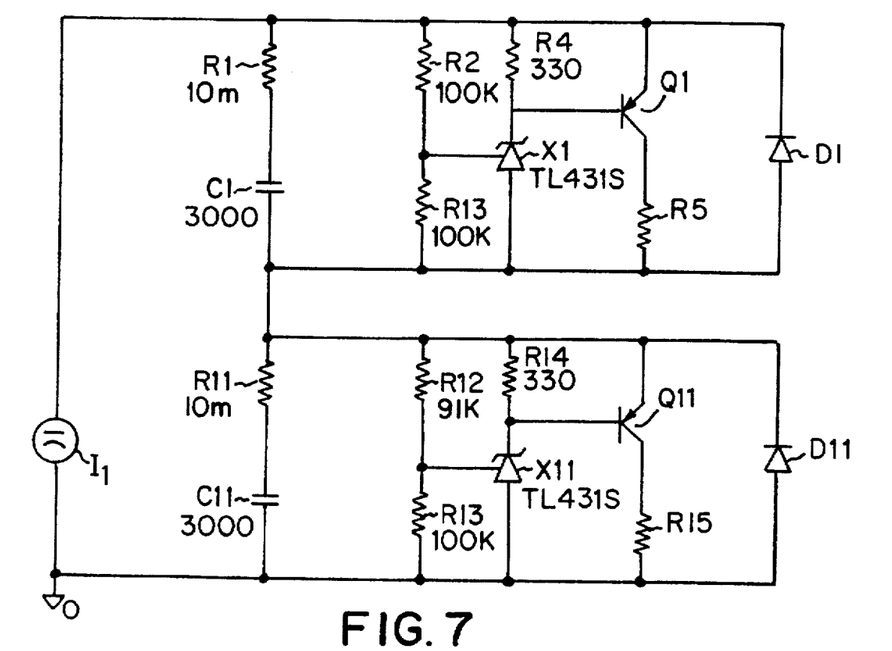
FIG. 7 is a circuit diagram of a charge-limiting circuit consisting of two stages.
Figure 8:
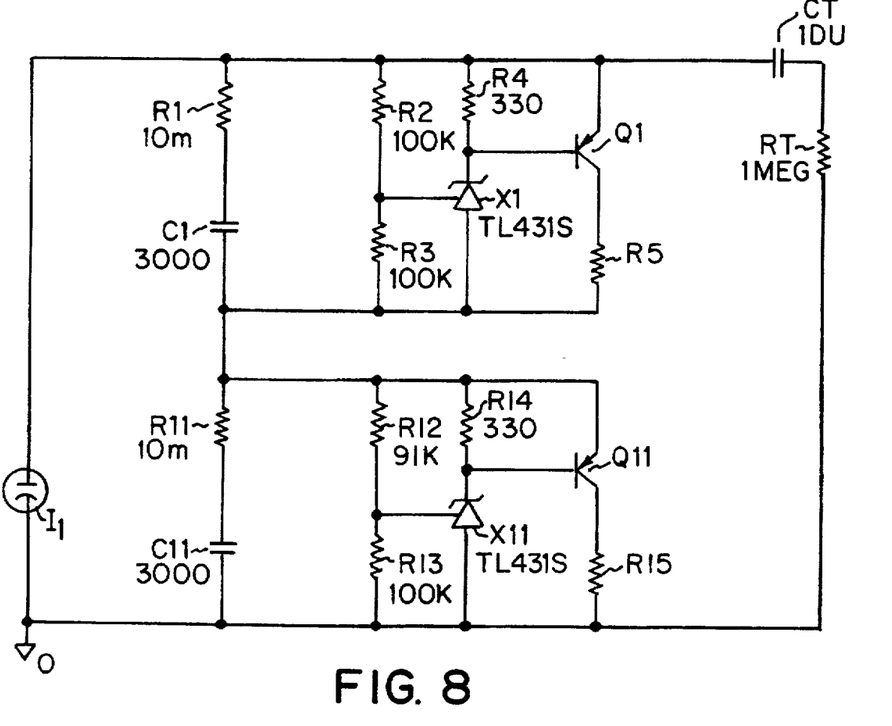
FIG. 8 is a circuit diagram of a full charge-detecting circuit consisting of two stages.
Figure 9:
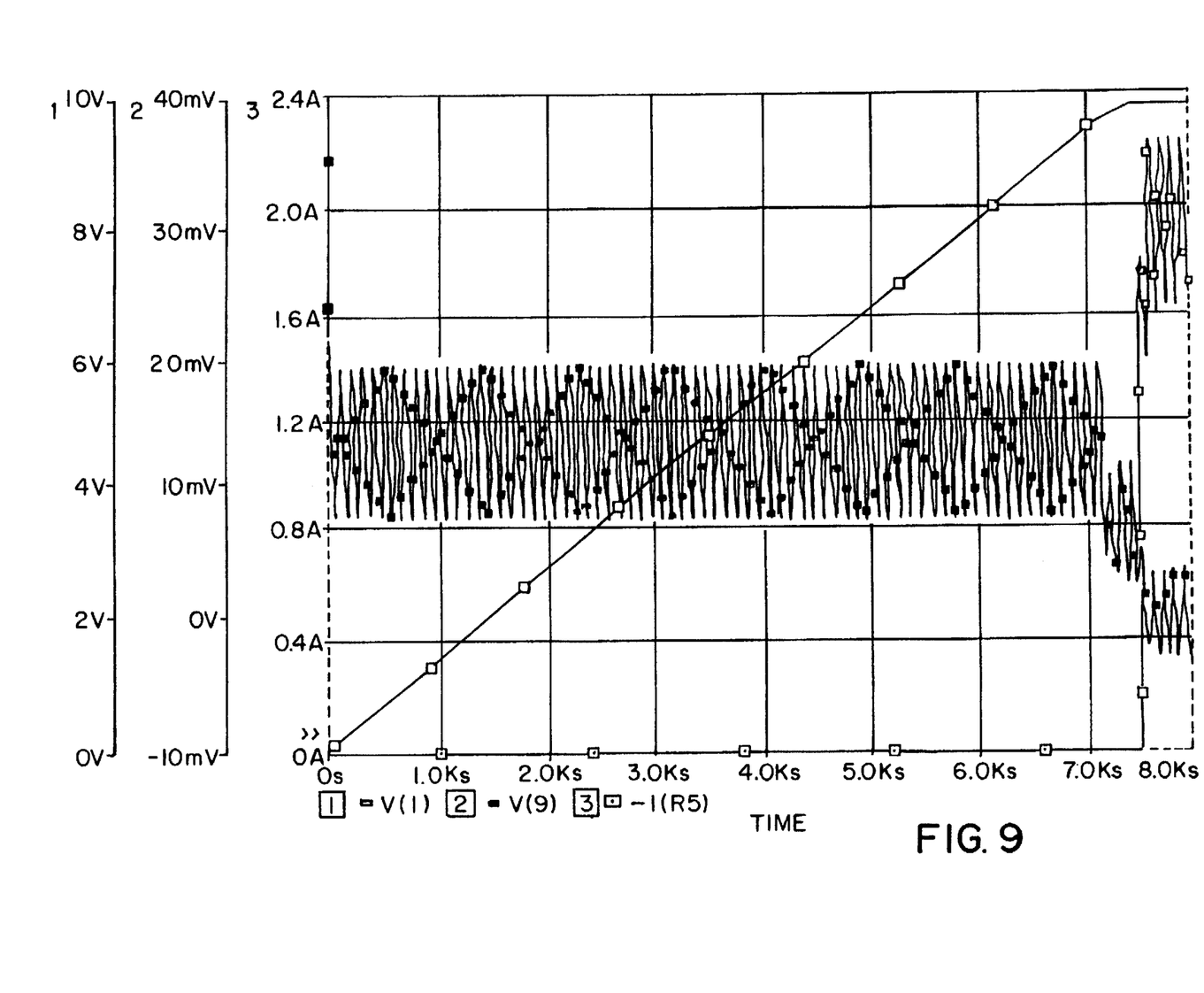
FIG. 9 shows waveforms illustrating the results of an analysis made by simulating the full charge-detecting circuit shown in FIG. 8.

FIG. 5 shows an example of the full charge-detecting circuit in which a charge-limiting circuit has been included. FIG. 6 shows the results of an analysis made by simulating the full charge-detecting circuit shown in FIG. 5. FIG. 7 is a diagram showing a charge-limiting circuit consisting of two stages. FIG. 8 is a diagram showing a full charge-detecting circuit consisting of two stages. FIG. 9 shows the results of an analysis made by simulating the full charge-detecting circuit shown in FIG. 8.

Referring to FIG. 5, a charge-limiting circuit and a differentiating circuit consisting of CT and RT are connected in parallel with an electric double layer capacitor C1 having an internal resistance of R1. The charge-limiting circuit comprises a three-terminal shunt regulator ICX1, a transistor Q1, a Schottky diode D1, and resistors R2–R5. When the capacitor C1 is electrically charged from a charging power supply I1 and becomes fully charged, the charge-limiting circuit causes the current to bypass the capacitor. This fully charged condition is detected by the differentiating circuit. This detection is performed by superimposing an AC waveform on the charging power supply I1.

FIG. 6 shows waveforms during the charge process of an electric double layer capacitor used in power applications. The capacitor, with an electrostatic capacitance of 300 F, maximum working voltage of 50 V, and an electric capacity of 100 WH, is charged from completely discharged condition by a charging current of 2 A. The voltage across the terminal of the capacitor is indicated by V(1) and the current through the resistor R5 in the charge-limiting circuit is I(R5). The terminal voltage at the resistor RT in the differentiating circuit is indicated by V(9) in FIG. 6. A ripple current having a frequency of 10 MHz and an amplitude of 0.5 A is superimposed. This extraordinary low ripple frequency permits the waveform showing the result of an analysis clearly in those figures. In practice, ripple current from a rectifier circuit used for AC power line can be used. In FIG. 6, the charging voltage approaches 50 V when a charging operation persists for 7400 seconds. When the charge-limiting circuit is operated, the current I(R5) flowing through the resistor R5 and the terminal voltage V(9) at the resistor RT change violently. Therefore, a fully charged condition can be easily known by detecting these changes.

The configuration shown in FIG. 7 is built for electrical power applications as described below. The electric double layer capacitors C1 and C11 are connected in series. The charge-limiting circuit consisting of the components R2–R5, X1, Q1, and D11 and the charge-limiting circuit consisting of components R12–15, X11, Q11, and D11 are connected with the capacitors, respectively. When each capacitor reaches its rated condition, the charge-limiting circuit connected with the capacitor turns on the bypass circuit. Thus, all the capacitors are prevented from being applied with a voltage exceeding the rated value. In this manner, the voltages of the cells are monitored and can be made uniform. Consequently, the power supply can be used up to the rated value safely. Furthermore, the fully charged condition can be detected precisely by detecting the condition in which all the charge-limiting circuits connected in series via the differentiating circuit consisting of CT and RT as shown in FIG. 8 have been operated.

In the configuration shown in FIG. 8, the two electric double layer capacitors C1 and C11 are connected in series. A simulation was made in which each of these two capacitors C1 and C11 had a maximum working voltage of 25 V and an electrostatic capacitance of 600 F, and in which the settings of the charge-limiting circuits were intentionally shifted to about 24 V and 23 V, respectively. The results of this analysis are shown in FIG. 9. That is, the line indicating the whole charging voltage V(1) is bent near the end of the charging process. Observation of the terminal voltage V(9) at the resistor RT of the differentiating circuit and the current I(R5) flowing through the resistor R5 of one charge-limiting circuit shows that one capacitor is fully charged and then the other is fully charged.

It can be seen from the foregoing that the following methods can be used to sense that a storage capacitor power supply having a plurality of electric double layer capacitors connected in series, in parallel, or in any combination of series and parallel, has been fully charged. In one method, signals are taken from all the charge-limiting circuits connected with the capacitors. These signals are ANDed to sense that all the capacitors have reached their rated conditions. In this state, the power supply is regarded as being fully charged. In a second method, the operating points of all the charge-limiting circuits connected with the capacitors are previously set within a given tolerance, e.g., 5%, using techniques of inspection and quality control. One of the capacitors is selected. When the operating point of the charge-limiting circuit for this capacitor is reached, the power supply is regarded as being fully charged. In a third method, an AC waveform or a pulse waveform is superimposed on the currents produced from current regulation circuits or pseudo-current regulation circuits used for the charging of the capacitors. The amplitudes are monitored to detect the fully charged condition. In this method, the amplitudes decrease suddenly when all the capacitors connected as loads are fully charged and all the charge-limiting circuits turn on the bypass circuits. This point is detected to detect the fully charged condition of the power supply.

Detection of the residual electric power utilized in the novel storage capacitor power supply is described next. The novel storage capacitor power supply rarely employs only one electric double layer capacitor. As described in connection with FIG. 4, plural electric double layer capacitors are connected in series to form a block. Alternatively, such series combinations of the capacitors are connected in parallel to form a block. In this case, the residual electric power W is given by $$W = 0.5 \cdot Ca \cdot Va \cdot Va + 0.5 \cdot Cb \cdot Vb \cdot Vb \qquad (1)$$

where Ca is the capacitance of the capacitor block A, Va is the voltage developed across the capacitor block A. Cb is the capacitance of the capacitor block B, and Vb is the voltage developed across the capacitor block B. Accordingly, the residual electric power can be found accurately by measuring the voltages Va and Vb across the blocks A and B, respectively, and introducing these values into an arithmetic unit performing the above-described calculation.

Figure 10A:
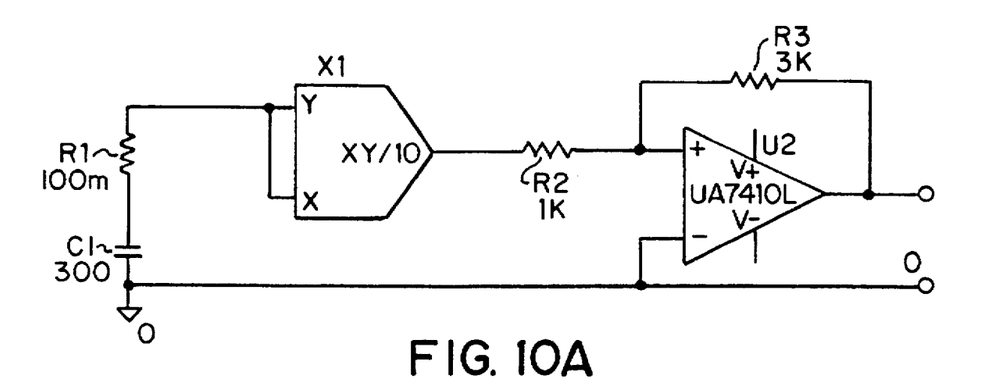
FIGS. 10A and 10B are circuit diagrams of residual electricity-detecting circuit for use in a storage capacitor power supply according to the invention.
Figure 10B:
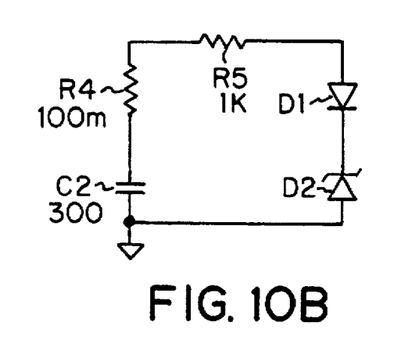
Figure 11:
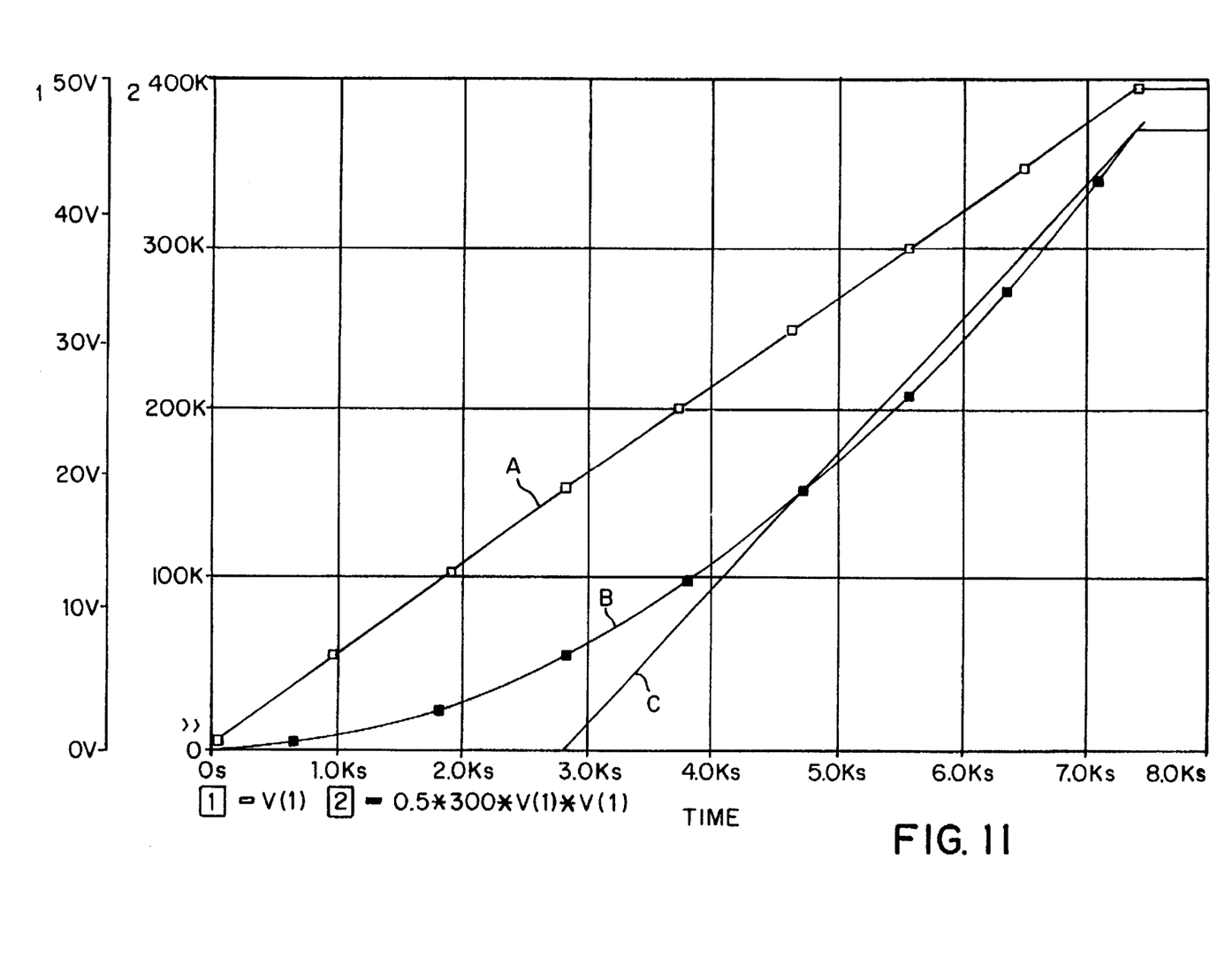
FIG. 11 shows waveforms illustrating the results of an analysis made by simulating the charging and discharging characteristics of an electric double layer capacitor.

FIG. 10 shows a residual electricity-detecting circuit used in the novel storage capacitor power supply. FIG. 11 shows the results of an analysis performed by simulating charging-and-discharging characteristics. FIG. 10A shows a circuit comprising a multiplier X1 and an operational amplifier U2. The multiplier X1 calculates the square of V. The calculated square is multiplied by a constant factor by means of the operational amplifier U2. In this way, the circuit produces a signal indicating the residual capacity. Where the residual electric powers of a plurality of electric double layer capacitors or of a plurality of capacitor blocks are detected, the multiplier X1 and a resistor R2 are provided for each capacitor or each capacitor block and connected with a node 3. Thus, a signal indicating the sum of the residual electric powers can be taken from the outputs from the operational amplifiers U2. In FIG. 10B, a resistor R5, a light-emitting diode D1, and a zener diode D2 are connected in series with an electric double layer capacitor C2 and its internal resistance R4 to roughly represent the residual electric power by means of a light quantity. The resistor R5 is used as a current-limiting resistor which adjusts the gradient, or the brightness of the light-emitting diode D1. Of course, an indicator can be used instead of the light-emitting diode D1. Instead of the zener diode, any other voltage regulation device or constant-voltage source can be used as long as it forms a voltage regulator circuit.

The line A of FIG. 11 indicates the voltage developed across the terminals of an electric double layer capacitor having an electrostatic capacitance of 300 F, a maximum working voltage of 50 V, and an electric energy of about 100 WH. At the beginning, the capacitor is fully discharged. Then, it is charged with a current of 2 A. The line B of FIG. 11 indicates the residual electric power calculated, using the equation described above. A residual electric power meter indicates $0.5 \times 300 \times 49 \times 49$=about 360 kJ, i.e., 100 WH. The line C of FIG. 11 is obtained by superimposing a straight line on the line B. This characteristic is derived by connecting a zener diode of about 18 V in series with the terminal voltage V(1). It can be seen that the residual electric power can be measured with practical accuracy from the fully charged condition to about three fourths of the range downwardly.

It is to be understood that the present invention is not limited to the above-described embodiments and that various changes and modifications are possible. In the above embodiments, the means which turns on and off the circuit is merely a switch. A semiconductor switching device such as a thyristor or a transistor or other switching device may be used. Furthermore, the application of the novel electric double layer capacitor is not limited to the power supply of an electric vehicle. For instance, the novel power supply can also be used as the power supply of an electric welder or other electrically powered machine, as the power supply of a portable electrical appliance such as a flash lamp, radio receiver, television receiver, or video camera.

According to the present invention, as can be seen from the description made thus far, the charging of each capacitor is controlled to the full charge level by the voltage across the terminals of the capacitor. Therefore, the electrical energy can be stored effectively. Also, the efficiency at which the storage capacitor power supply supplies electric power can be enhanced. Furthermore, the capacitors can be prevented from being applied with voltages exceeding the rated voltage. Consequently, where the power supply is used to store electricity, decreases in the capacitances of the capacitors, increase in the leakage current, and other problems can be prevented.

Having thus described my invention with the detail and particularity required by the Patent Laws, what is desired and claimed to be protected by Letters Patent is set forth in the following claims.

What is claimed is:

1. A storage capacitor power supply adapted to store electricity in a capacitor block consisting of a plurality of capacitors connected to supply electric power to a load, said power supply comprising:

a charge-limiting circuit connected in parallel with each capacitor and causing the charging current to bypass the capacitor by sensing that the voltage across any capacitor has reached a given value;

a full charge-detecting circuit which detects operation of the charge-limiting circuit and makes a decision to see if a fully charged condition has occurred, wherein said full charge-detecting circuit performs a logical operation on the output signals from the charge-limiting circuits; and a means for superimposing an AC waveform to the charging currents, wherein said full charge-detecting circuit monitors the amplitude of the AC waveform.

2. A storage capacitor power supply adapted to store electricity in a capacitor block consisting of a plurality of electric double layer capacitors connected to supply electric power to a load, said power supply comprising:

a charge-limiting circuit having a transistor connected in parallel with each of the electric double layer capacitors and causing the charging current to bypass each of the electric double layer capacitors by sensing that the voltage across any capacitor has reached a given value;

a full charge-detecting circuit which monitors the operation of the charge-limiting circuit in order to make a decision whether or not a fully charged condition has occurred; and a means for superimposing an AC waveform on the charging currents, wherein said full charge-detecting circuit monitors the amplitude of the AC waveform.

3. A storage capacitor power supply adapted to store electricity in a capacitor block consisting of a plurality of capacitors connected to supply electric power to a load, said power supply comprising:

a charge-limiting circuit connected in parallel with each capacitor and causing the charging current to bypass the capacitor by sensing that the voltage across any capacitor has reached a given value; and a full charge-detecting circuit which detects operation of the charge-limiting circuit and makes a decision to see if a fully charged condition has occurred, wherein there is further provided a means for superimposing an AC waveform to the charging currents and wherein said full charge-detecting circuit monitors the amplitude of the AC waveform.

4. A storage capacitor power supply adapted to store electricity in a capacitor block consisting of a plurality of electric double layer capacitors connected to supply electric power to a load, said power supply comprising:

a charge-limiting circuit connected in parallel with each of the electric double layer capacitors and causing the charging current to bypass each of the electric double layer capacitors by sensing that the voltage across any capacitor has reached a given value; and a full charge-detecting circuit which detects operation of the charge-limiting circuit and makes a decision to see if a fully charged condition has occurred, wherein there is further provided a means for superimposing an AC waveform to the charging currents and wherein said full charge-detecting circuit monitors the amplitude of the AC waveform.

* * * * *

UNITED STATES PATENT AND TRADEMARK OFFICE
CERTIFICATE OF CORRECTION

PATENT NO. : 5,783,928
DATED : July 21, 1998
INVENTOR(S) : Michio Okamura

It is certified that error appears in the above-identified patent and that said Letters Patent is hereby corrected as shown below:

Column 4 Line 13 "circuit" should read --circuits--.

Column 10 Line 1 "FIG. 10 shows a residual electricity-detecting circuit" should read --FIGS. 10A and 10B show residual electricity-detecting circuits--.

Signed and Sealed this

Third Day of November, 1998

Attest:

BRUCE LEHMAN

Attesting Officer
Commissioner of Patents and Trademarks